US012418090B2

(12) United States Patent
Ribiere et al.

(10) Patent No.: US 12,418,090 B2
(45) Date of Patent: Sep. 16, 2025

(54) MODULAR MAST

(71) Applicant: STATIONS-E, Boussy-Saint-Antoine (FR)

(72) Inventors: Francois Ribiere, Etrechy (FR); Alain Rolland, Quincy-sous-Senart (FR)

(73) Assignee: STATIONS-E, Boussy-Saint-Antoine (FR)

( * ) Notice: Subject to any disclaimer, the term of this patent is extended or adjusted under 35 U.S.C. 154(b) by 350 days.

(21) Appl. No.: 18/128,220

(22) Filed: Mar. 29, 2023

(65) Prior Publication Data

US 2023/0378633 A1 Nov. 23, 2023

(30) Foreign Application Priority Data

Apr. 1, 2022 (FR) ...................................... 2202984

(51) Int. Cl.
*H01Q 1/12* (2006.01)
*H01Q 21/00* (2006.01)

(52) U.S. Cl.
CPC ....... *H01Q 1/1242* (2013.01); *H01Q 21/0025* (2013.01)

(58) Field of Classification Search
CPC .... E04H 12/08; E04H 12/342; H01Q 1/1242; H01Q 21/0025; H01Q 1/246; H01Q 1/1228
See application file for complete search history.

(56) References Cited

U.S. PATENT DOCUMENTS

| | | | | |
|---|---|---|---|---|
| 10,843,907 | B2 * | 11/2020 | Lagerweij | E04H 12/342 |
| 10,957,967 | B2 * | 3/2021 | Smith | B61L 3/126 |
| 2018/0282134 | A1 | 10/2018 | Lagerweij et al. | |
| 2019/0296419 | A1 | 9/2019 | Smith et al. | |
| 2024/0106102 | A1 * | 3/2024 | Rolland | E04H 5/02 |

FOREIGN PATENT DOCUMENTS

| | | | | |
|---|---|---|---|---|
| FR | 2947292 A1 * | 12/2010 | | E04H 12/085 |
| KR | 20210008291 A * | 1/2021 | | |
| WO | WO-2010098653 A2 * | 9/2010 | | E04H 5/02 |

OTHER PUBLICATIONS

International Search Report dated Oct. 31, 2022.

* cited by examiner

*Primary Examiner* — Rodney Mintz
(74) *Attorney, Agent, or Firm* — IPSILON USA, LLP

(57) ABSTRACT

A modular mast (1) intended to be fixed to a bearing element and to accommodate at least one telecommunication antenna includes at least two sections (2 and 3 or 3 and 4) assembled in the extension of one another by respective ends, and one of the sections (2, 3 or 4) having, at its end assembled with the other section (2, 3 or 4), at least one cutout (10) and the latter section having at least one tooth (11) coming axially to bear in the bottom (17) of the cutout (10). At least one seal (15) is present between an edge of the cutout (10) and an adjacent edge of the tooth (11). A plurality of securing plates (12) link the ends of the sections (2 and 3 or 3 and 4) internally therein.

16 Claims, 5 Drawing Sheets

MODULAR MAST

RELATED APPLICATION

This application claims the benefit of priority from French Patent Application No. 22 02984, filed on Apr. 1, 2022, the entirety of which is incorporated by reference.

TECHNICAL FIELD

The present invention relates to telecommunications infrastructure elements, and more particularly the masts bearing telecommunication antennas.

PRIOR ART

The antennas of the telecommunications networks are conventionally borne by masts fixed to the ground or to infrastructure elements.

Sectional masts are known from the prior art that can accommodate a telecommunication antenna with hollow cylindrical modules, notably of varying heights and of substantially identical diameters, allowing the cables to be run to the antenna.

Moreover, it is known practice to fix additional equipment, such as a camera, an advertising panel or lamps, onto the periphery of the mast.

The application WO2010/098653 describes a telecommunications mast that can accommodate an antenna on its upper part, and communication cables inside, that has a modular design comprising identical sections, of different heights, that allow the assembly thereof section by section. These assemblies are made using connecting flanges including holes to receive fixing means, such as screws, situated at the ends of the modules. This document also describes supports of hook/boom type, disposed on the periphery of the modules, allowing equipment to be attached thereto, such as lamps. Such a mast is relatively costly to produce through the fixing of the flanges and is not as aesthetically pleasing. Furthermore, the presence of the flanges creates protuberances that promote the build-up of soiling and make the mast more difficult to clean.

The application KR10-2021-0008291 discloses a modular mast that can accommodate an antenna, arranged to allow electrical cables to run inside the modules, comprising cylindrical sections of identical diameter, some modules including fixing means on their outer wall allowing equipment to be attached, such as advertising panels or lamps. The modules include fixing means comprising a series of tabs on their upper part and a series of complementary holes on their lower part, the fixing of the tabs in the holes allowing two modules to be aligned and linked.

There is a need to have masts, that are aesthetically pleasing and easy to maintain, for bearing telecommunication antennas and allowing communication or electrical radio cables to be run, which can be transported easily, which can be rapidly erected and the assembly of which is easy to perform on site.

SUMMARY OF THE INVENTION

The present invention addresses this need by proposing a modular mast intended to be fixed to a bearing element and to accommodate at least one telecommunication antenna, comprising:

- at least two sections assembled in the extension of one another by respective ends, one of the sections having, at its end assembled with the other section, at least one cutout and the latter section having at least one tooth coming axially to bear in the bottom of the cutout,
- at least one seal present between an edge of the cutout and an adjacent edge of the tooth,
- a plurality of securing plates linking the ends of the sections internally therein.

The advantage of such a modular structure of the mast is that the sections can be transported more easily than an entire mast, the mast being assembled directly on the site of installation. The modular aspect of such a structure also makes it possible to easily adapt the height of the mast to the requirements, according to the equipment accommodated.

The tooth and the cutout form a link by complementarity of forms which facilitates the relative positioning of the modules with the right angular orientation, which makes the fixing of the securing plates easier.

The absence of an annular flange between the sections contributes to the aesthetic appearance of the mast and simplifies the cleaning thereof.

The structure of the modular mast according to the invention makes it possible, if so desired, to be able to withstand strong and very strong winds, notably to observe a maximum of 1° of deflection in the zone 3 (EN 1991-1-4).

The telecommunication antenna can be fixed to the apex of the mast, for example using fixing holes present on the mast, the latter being advantageously pre-drilled to that end. These holes can be situated at a distance of between 10 mm and 150 mm, better between 10 mm and 100 mm, from the top end of the mast.

The pre-drilling of the fixing holes and their distance with respect to the top end of the mast can be adapted according to the antenna support used.

The mast can bear various equipment in addition to the telecommunication antenna present at its apex, for example lateral microwave radio systems, sensors or cameras, as well as one or more lamps for lighting the bearing element or its environment. The antenna present at its apex is, for example, housed in a top cap.

The mast can be fixed to the upper part of the bearing element by virtue of brackets and a support plate, the seat of which is adjustable relative to the bearing module. That makes it possible to adjust the vertical alignment of the mast when mounting and correcting any misalignment.

The mast can have a total height of between 0.6 m and 14.5 m, better between 4 m and 10 m, notably between 7 m and 9 m.

The mast can be cylindrical, notably of circular section, or conical.

The mast can have a cross-section with an outer diameter of between 80 mm and 350 mm, notably between 150 mm and 250 mm. The cross-section can have an internal diameter of between 75 mm and 345 mm, notably between 145 and 245 mm.

The number of sections of the modular mast is greater than or equal to 2, notably between 2 and 6, for example equal to 3.

The mast can comprise at least two sections of identical height, for example the two lowest sections. The height of these sections can be between 0.6 m and 4.5 m, better between 1.5 m and 4.5 m, notably between 2.5 m and 3.5 m.

The expression "the two lowest sections" is understood here to mean the bottommost sections on the mast, that is to say, the base section fixed onto the bearing module and the next section assembled on this base section.

The top section of the mast can have a height different from that of the other sections, notably a height of between 0.5 m and 3.5 m, better between 1 m and 3 m. The choice of the height of the top section thus makes it possible to adapt the height of the mast according to the requirements, notably according to the height of the antenna.

"Top section" is understood to mean the topmost section on the mast.

The thickness of the wall of the sections can be between 5 mm and 12 mm.

Preferably, the sections are made of metal, notably of steel or of stainless steel.

The cutout situated at the end of the section assembled with the other section can have a substantially trapezoidal outline when seen from the side, better, a substantially isosceles trapezoidal outline, the bottom of the cutout forming the small base of the trapezium. Such a trapezoidal form facilitates the centring upon insertion into the cutout, and also makes it possible to have a good transmission of the axial forces.

The tooth situated at the end of the other section, which comes axially to bear at the bottom of the cutout, preferably has an outline similar to that of the cutout. It can thus have, when seen from the side, a substantially trapezoidal outline, better, a substantially isosceles trapezoidal outline, the vertex of the tooth forming the small base of the trapezium.

The height of the trapezium can be between 20 mm and 70 mm, preferably between 20 mm and 50 mm.

The width of the small base of the trapezium can be between 10 mm and 50 mm.

The width of the large base of the trapezium can be between 30 mm and 80 mm.

The first section can comprise at least two cutouts angularly evenly distributed at its end assembled with the second section, in particular three cutouts angularly evenly distributed at its end assembled with the second section. Thus, the mechanical forces are best distributed between the sections.

The first section can comprise at least two identical cutouts, and better, all the cutouts are identical, which avoids having to angularly identify one section with respect to the other during assembly. As a variant, at least one cutout is different, when wanting for example to index one section in position with respect to the other in a particular angular orientation.

In exemplary embodiments, the tooth or teeth are situated on the top end of the section below and the corresponding cutout or cutouts are situated on the bottom end of the section above. The section above being stacked on the section below, this arrangement of the tooth or teeth and of the cutout or cutouts makes it possible to fit the sections together.

The abovementioned seal is preferably absent at the bearing point between the bottom of the cutout and the vertex of the tooth which comes into contact with the bottom of this cutout, so as to allow each section to rest stably on the preceding one.

The thickness of the seal is for example between 2 mm and 7 mm.

The seal can be made of an elastomer material, for example a silicone.

The securing plates are, preferably, fixed to the assembled ends of the sections in angular segments lying between the tooth/cutout links of these sections.

The height of the securing plates can be between 100 mm and 400 mm, being preferably between 150 mm and 350 mm.

The width of the securing plates can be between 20 mm and 300 mm, notably between 50 mm and 200 mm.

The thickness of the securing plates can be between 2 mm and 50 mm, preferably between 5 mm and 25 mm.

There are for example three of the securing plates.

The securing plates are preferably angularly evenly distributed about the longitudinal axis of the mast.

For example, the assembled ends comprise three evenly distributed tooth/cutout links and three securing plates angularly evenly distributed about the longitudinal axis of the mast, the tooth/cutout links being separated by an angle of 120° from one another, the securing plates being separated by an angle of 120° from one another, and the angle separating the axis of a tooth/cutout link from that of a securing plate being equal to 60°.

The securing plates are preferably all identical.

At least one securing plate, and better, each securing plate, can be welded onto one of the sections and screwed to the other section.

At least one securing plate can, as a variant, be screwed to the two sections that it links.

At least one securing plate can be screwed onto one of the two assembled sections by virtue of at least two fixing holes, situated on the part of the securing plate in contact with this section, these two fixing holes being able to be on top of one another and being able to be centred on the part of the securing plate in contact with this section.

The part of the securing plate comprising the two fixing holes can have a height of between 25 mm and 300 mm, preferably between 100 mm and 200 mm. It can have a width of between 20 mm and 300 mm, preferably between 50 mm and 150 mm.

The other part of the plate can have a height of between 10 mm and 300 mm, preferably between 50 mm and 200 mm. It can have a width of between 20 mm and 300 mm, notably between 50 mm and 200 mm.

At least one of the securing plates can be composed of an assembly of at least two, and better three, flats, welded pairwise by a weld bead along their longitudinal axis. That makes it possible to give each plate a form that substantially follows the curvature of the inner surface of the section, without having to perform a bending operation.

The central flat of the assembly can have a width of between 10 mm and 150 mm, preferably between 20 mm and 100 mm.

The two lateral flats can have the same width, notably between 10 mm and 150 mm, better between 20 mm and 60 mm.

In a plane at right angles to the longitudinal axis of the securing plate, the two lateral flats can be oriented towards the interior with respect to the central flat by an angle of between 5° and 50°, preferably between 15° and 35°.

Each securing plate is preferably made of galvanized steel. The galvanization of each securing plate for example takes place after the welding thereof on a corresponding section, which makes it possible to protect the weld from corrosion. As a variant, in the case of securing plates secured to the two sections that they link, the galvanization of each securing plate and of the sections can take place before the latter are screwed to the sections. The post-galvanization rework operations are thus linked, and the assembly of the sections before the complete tightening of the plates can facilitate the fitting together thereof.

All the sections of the mast can be assembled in the same way with one another, in the extension of one another, by their respective ends.

The mast can comprise at least one hole on its periphery, intended to allow electrical cables to be run from the inside of the mast to the outside. The mast can be supplied with a shutter prepositioned in this hole. The hole is for example situated on a section, in the alignment of a cutout. The diameter of the hole can be between 5 mm and 100 mm, preferably between 5 mm and 70 mm.

Another subject of the invention is a method for mounting and installing the modular mast according to the invention, comprising the following steps:

running the communication or electrical radio cables intended to link the bearing element to the telecommunication antenna, section by section, assembling the sections on the ground by fixing the securing plates to the ends of the sections, and mounting the mast on the bearing element.

The running of the cables, on the ground, section by section, makes it possible to avoid having to do it when installing the antenna on the mast.

BRIEF DESCRIPTION OF THE DRAWINGS

The invention will be able to be better understood on reading the following detailed description, of a nonlimiting example of implementation thereof, and on studying the attached drawing, in which.

DETAILED DESCRIPTION

Figure 1:
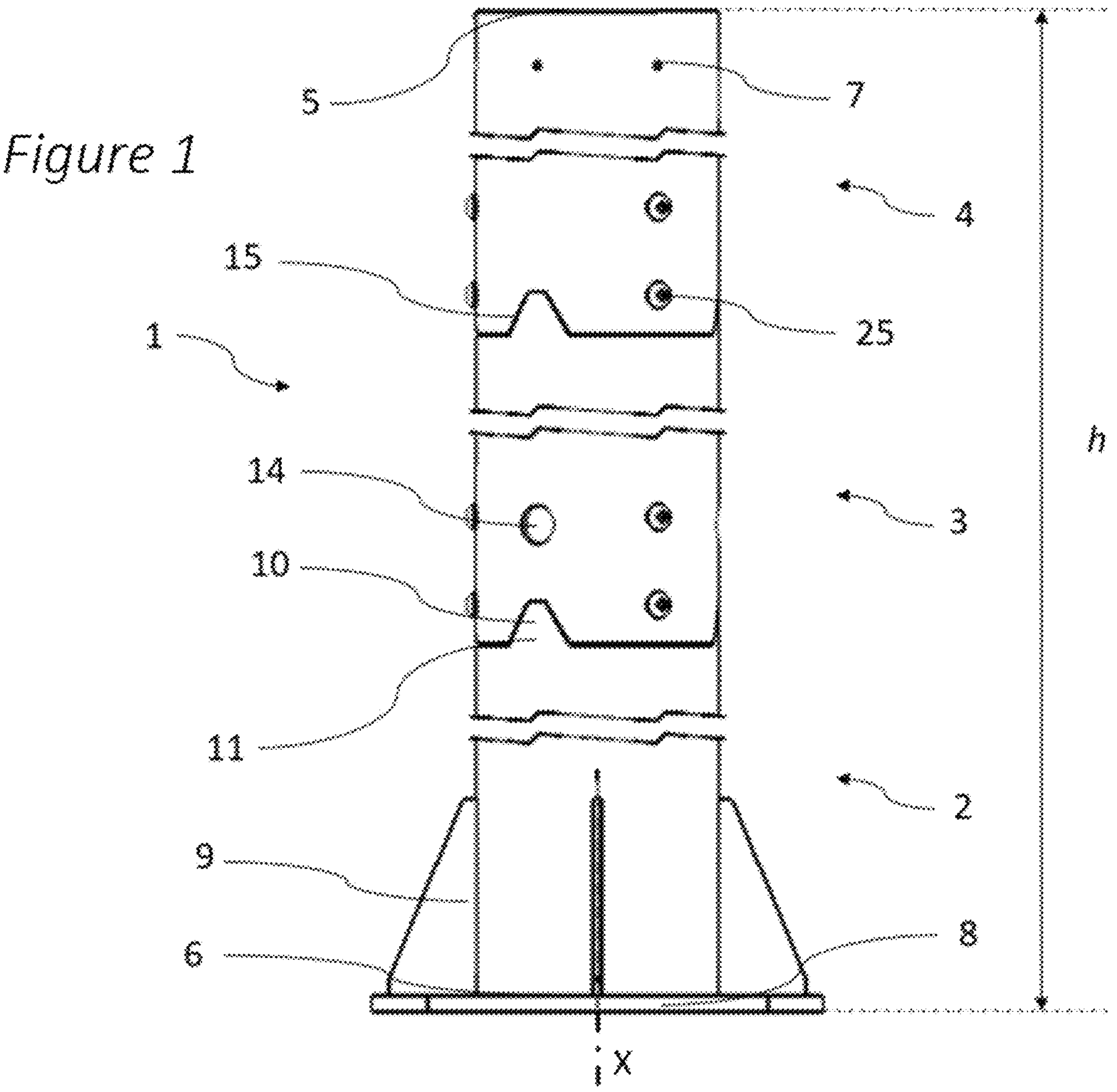
FIG. 1 is a schematic and partial view in elevation of an example of a modular mast according to the invention.

FIG. 1 illustrates a modular mast 1 according to the invention. This modular mast 1 comprises three sections 2, 3 and 4, assembled pairwise at their respective ends. The longitudinal axes of the three sections coincide with the longitudinal axis of the mast X, oriented vertically. The mast can, as a variant, comprise only two sections, or more than three sections.

Figure 8:
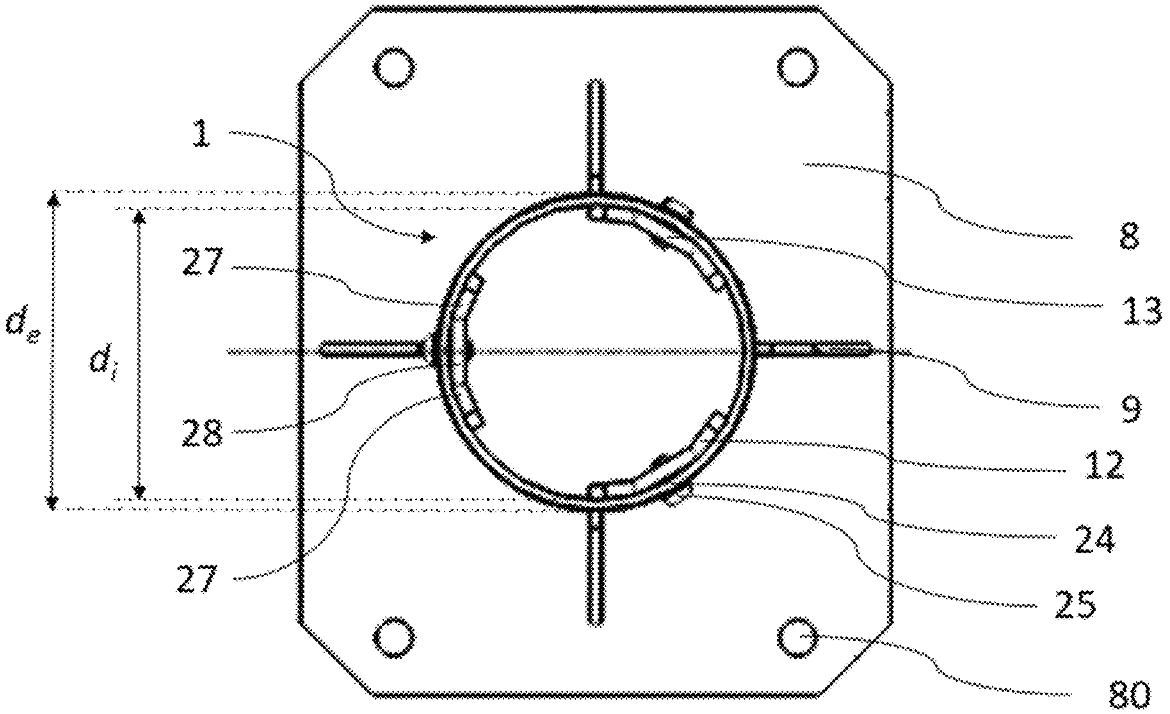
FIG. 8 represents, in a top view, schematically and partially, the mast of FIG. 1.

The cross-section of the mast 1 is, for example, as visible in FIG. 8, circular with an outer diameter $d_e$ equal to approximately 220 mm. It for example has an internal diameter $d_i$ equal to approximately 210 mm.

A telecommunication antenna (not represented) is provided to be borne by the top end 5 of the mast 1. The antenna is, for example, intended for a telecommunications network for mobile telephones, notably a so-called 4G, 5G or later generation network, or any other standard network, for example an IoT or BLR network.

The antenna can be fixed to the top of the mast 1 by virtue of the fixing holes 7, allowing the antenna to be screwed onto the mast 1. In the example of FIG. 1, six fixing holes 7 are distributed equidistantly on the periphery of the mast 1.

The mast 1 is fixed at its bottom end 6 to a bearing module by virtue, for example, of a support plate 8 reinforced with brackets 9 welded to the plate 8 and to the mast 1. The seat of the support plate 8 can be adjustable relative to the bearing module by virtue, for example, of four screws inserted into fixing holes 80 of the plate 8. That makes it possible to adjust the vertical alignment of the mast 1 and correct any misalignment. The mast 1 can be fixed onto the bearing module in any way that makes it possible to ensure the stability and the vertical alignment of the mast 1.

The mast 1 can comprise holes 14, with a diameter for example equal to 35 mm, pre-drilled, for electrical cables to be run from the inside of the mast 1 to the outside. The mast 1 can be supplied with a removable shutter pre-mounted to conceal these holes, if they are not used.

The two bottom sections 2 and 3 of the mast 1 of FIG. 1 can be of the same height l, for example equal to 2.9 m.

The top section 4 can have a height l' different from that of the other two sections, 2 and 3. Its height l' can be equal to 2.45 m, to 2.15 m, or even equal to 1.6 m for example. The total height h of the mast can then be between 7.4 and 8.3 m for example, depending on the section 4 used.

Each section 2, 3 or 4 can be made of metal, notably of steel or of stainless steel, with a thickness for example of between 5 mm and 10 mm.

Figure 5:
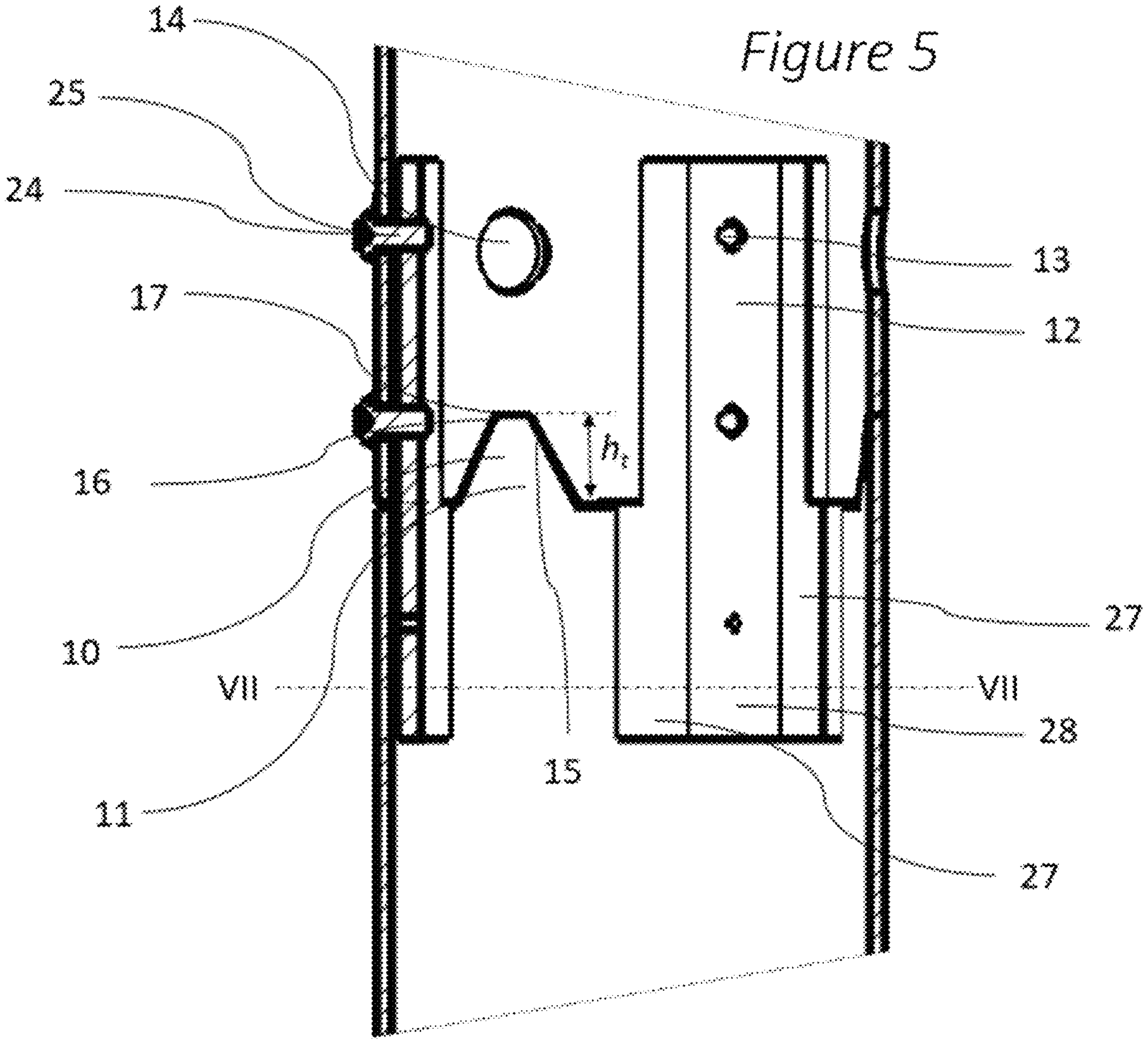
FIG. 5 represents, schematically and partially, a detail of the assembly between two sections of the mast of FIG. 1.

In the example considered, the assembly of the ends of two consecutive sections is performed by virtue of three securing plates 12 and three tooth 11/cutout 10 links, as illustrated in FIG. 5. The securing plates 12 are, in this example, offset angularly from the adjacent tooth 11/cutout 10 links by an angle of 60° and separated from them by an angle of 120°.

The securing plates 12 are for example made of galvanized steel.

In the exemplary embodiment of FIGS. 1 to 8, the securing plates 12 are welded to the section below and screwed to the section above. In another embodiment, the securing plates 12 are screwed to both sections without being welded to them.

In the example considered, the securing plates 12 each comprise a hole 90 allowing the securing plate 12 to be fixed to the section below before welding, with a rapid spotweld.

Figure 6:
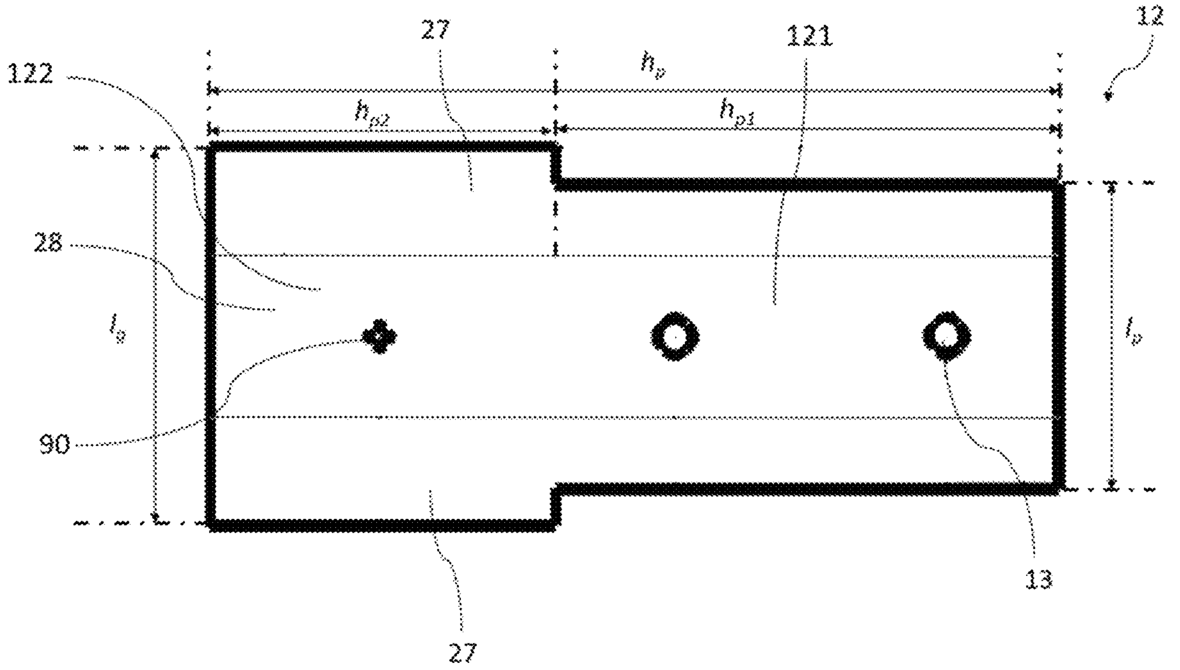
FIG. 6 represents, in isolation, schematically and partially, in a side view, a securing plate.

The height $h_p$ of a securing plate 12, visible in FIG. 6, is for example equal to 250 mm, with a first part 121 of the plate 12, screwed to the section above with a height $h_{p1}$ for example equal to approximately 150 mm, and a second part 122 welded to the section below with a height $h_{p2}$ for example equal to approximately 100 mm.

The width $l_p$ of the part 121 is, in the example considered, equal to approximately 90 mm and the width $l_g$ of the part 122 is, in this example, equal to approximately 110 mm.

Each securing plate 12 can be screwed using screws 25 to the section above by virtue of two fixing holes 13 situated one on top of the other on the securing plate, these screws being fitted through the corresponding holes 24 situated on the wall of the section above.

In the example considered, the securing plate 12 is composed of a longitudinal assembly of three metal flats, namely a central flat 28 and two lateral flats 27, these three flats being, for example, welded pairwise along their longitudinal edges using weld beads 29.

The central flat 28 for example has a width v equal to 45 mm, constant over the entire height $h_p$ of the plate 12. The lateral flats 27 can have a greater width on the part 122 of the securing plate than on the part 121, for example having a width w equal to approximately 30 mm on the part 122.

Figure 7:
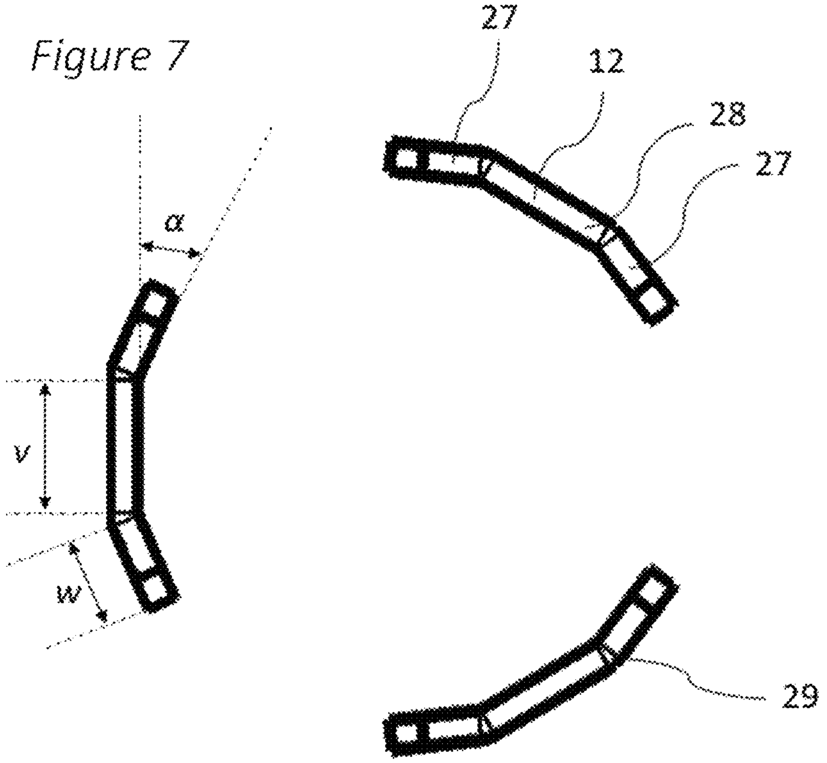
FIG. 7 is a schematic and partial cross-section, along the line VII-VII of FIG. 5.

In the example considered, the lateral flats 27 are oriented towards the inside by an angle α, for example equal to 24°, with respect to the plane of the central flat 28, in a plane at right angles to the longitudinal axis X of the mast 1, as can be seen in FIG. 7.

The metal flats 27 and 28 for example have a thickness equal to 10 mm.

Figure 2:
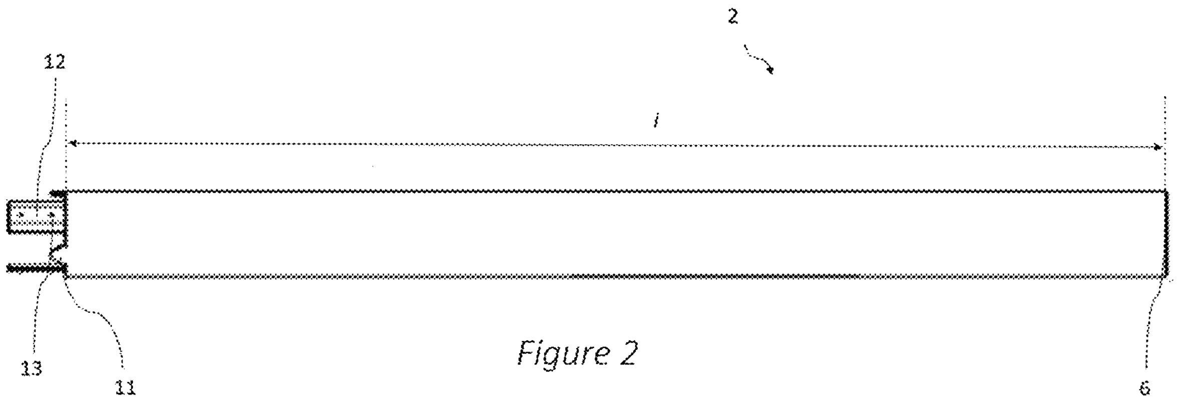
FIG. 2 represents, in isolation, schematically and partially, the first section of the mast of FIG. 1, starting from the bottom.
Figure 3:
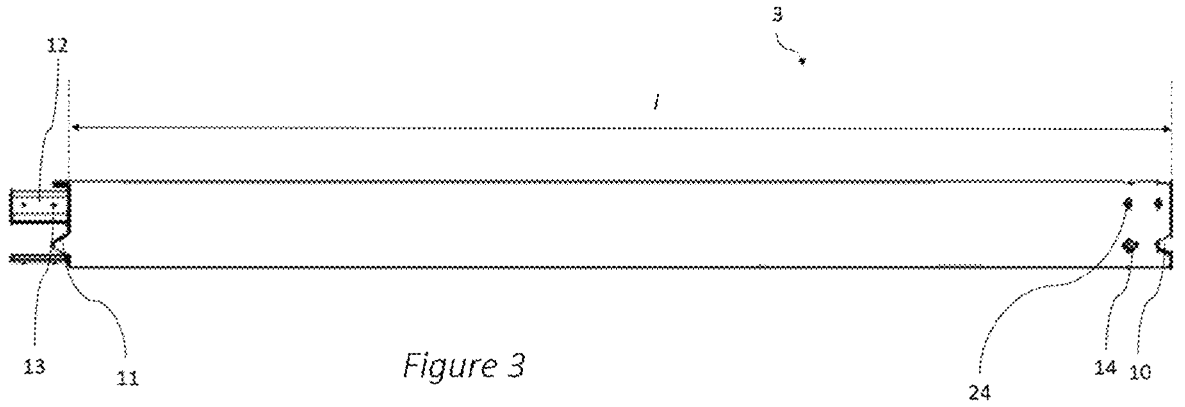
FIG. 3 represents, in isolation, schematically and partially, the second section of the mast of FIG. 1, starting from the bottom.
Figure 4:
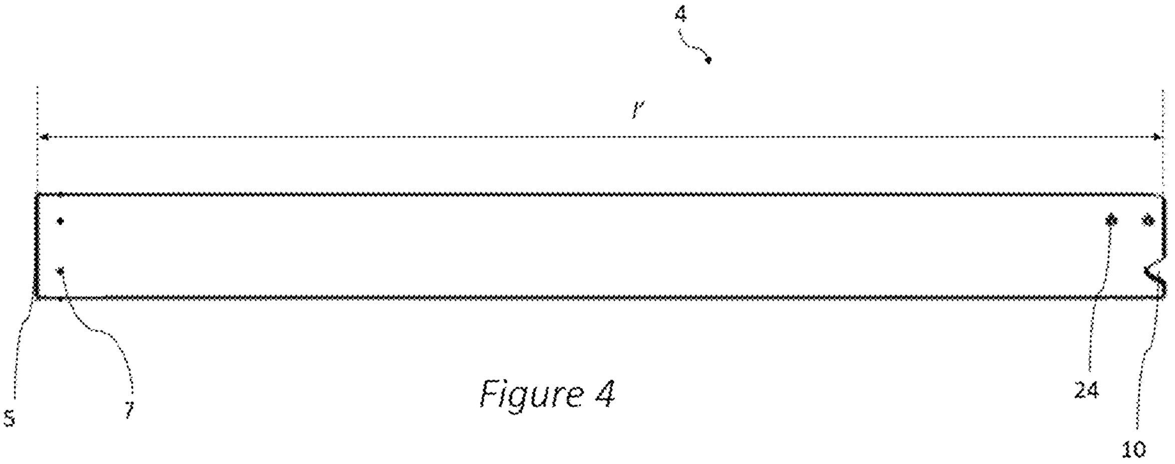
FIG. 4 represents, in isolation, schematically and partially, the third section of the mast of FIG. 1, starting from the bottom.

As can be seen in FIGS. 2, 3 and 4, the cutouts 10 can be situated at the bottom end of each section 3 and 4, and the teeth 11 can be situated at the top end of each section 2 and 3.

The cutouts 10 can be, as illustrated in FIG. 5, of generally isosceles trapezoidal form, the small base of the trapezium corresponding to the bottom 17 of the cutout 10.

The teeth 11 are also, in this example, of generally isosceles trapezoidal form, the small base of the trapezium corresponding to the vertex 16 of the tooth 11.

The height of the trapezium $h_t$ is, in the example considered, equal to approximately 35 mm.

In the example considered, a seal 15, for example made of silicone, is present between the edges of the cutout 10 and of the tooth 11. This seal 15 is absent from the zone of contact between the bottom 17 of the cutout 10 and the top 16 of the tooth 11, such that the tooth 11 and the cutout 10 are in metal-to-metal contact in this contact zone.

The mounting and the installation of the mast 1 can be done according to the following steps:

- running the electrical cables intended to link the bearing element onto which the end 6 of the mast 1 is intended to be fixed, to the telecommunication antenna intended to be fixed to the end 5 of the mast 1, section by section,
- assembling the sections 2, 3 and 4, on the ground, by fixing the securing plates 12, pre-mounted at one end of a section, in the end of the adjacent section, using screws, and
- mounting the mast 1 on the bearing element using the plate 8.

Obviously, many modifications can be made to the mast which has just been described, without departing from the scope of the present invention.

It is for example possible to produce the mast according to the invention with more than three sections. The assembly of the sections 2, 3 and 4 can also be done in a different configuration, for example with different numbers of securing plates 12 and of tooth 11/cutout 10 links.

In variants, the cutouts 10 are situated at the top end of the section 2 or 3, and the teeth 11 are situated at the bottom end of the section 3 or 4. The teeth 11 and the cutouts 10 can also not be of isosceles trapezoidal form.

The expression "between . . . and . . . " is understood to mean a closed interval, the bounds of which are included, unless stipulated otherwise.

The invention claimed is:

1. A modular mast configured to be fixed to a bearing element and to accommodate at least one telecommunication antenna, the mast comprising:

- at least two sections assembled in a vertical stack extension of one another by respective ends,
- a first of the sections having, at the respective end assembled with a second of the sections, at least one cutout and the second section having at least one correspondingly shaped tooth projecting therefrom and axially bearing in a bottom of the cutout such that that the at least one tooth is sealingly received within the at least one cutout,
- at least one seal positioned between an edge of the cutout and an adjacent edge of the tooth, and
- a plurality of securing plates linking the respective ends of the sections internally therein.

2. The mast according to claim 1, the seal being absent at a bearing point between the bottom of the cutout and a vertex of the tooth which comes into contact with the bottom of the at least one cutout.

3. The mast according to claim 1, the securing plates being fixed to the assembled ends of the sections in angular segments lying between tooth and cutout links of the sections.

4. The mast according to claim 1, at least one said securing plate being welded onto one of the sections and screwed to another of the sections.

5. The mast according to claim 1, at least one said securing plate being composed of an assembly of at least two flats, welded pairwise by a weld bead along a longitudinal axis thereof.

6. The mast according to claim 1, the tooth having a substantially trapezoidal outline in side view, a vertex of the tooth forming a small base of a trapezium.

7. The mast of claim 6, the tooth having a substantially isosceles trapezoidal outline.

8. The mast according to claim 1, the first section comprising at least two angularly evenly distributed cutouts at the respective end assembled with the second section.

9. The mast according to claim 8, the first section comprising three angularly evenly distributed cutouts at the respective end assembled with the second section.

10. The mast according to claim 1, wherein the plurality of securing plates comprises at least two securing plates angularly evenly distributed about a longitudinal axis of the mast.

11. The mast according to claim 10, wherein the at least two securing plates includes three securing plates angularly evenly distributed about the longitudinal axis of the mast.

12. The mast according to claim 1, each securing plate being made of galvanized steel.

13. The mast according to claim 12, at least one said securing plate being composed of an assembly of at least three flats, welded pairwise by a weld bead along a longitudinal axis thereof.

14. The mast according to claim 1, comprising at least one hole on a periphery of the mast, intended to allow passage of electrical cables from inside of the mast to an outside thereof.

15. The mast according to claim 14, the mast being provided with a shutter prepositioned in the at least one hole.

16. A method of mounting and installing a modular mast, comprising:

- providing the mast according to claim 1,
- running communication or electrical radio cables intended to link the bearing element to the telecommunication antenna, section by section,
- assembling the sections on a ground surface by fixing the securing plates to the respective ends of the sections, and
- mounting the mast on the bearing element.

* * * * *